United States Patent
Inskeep

(10) Patent No.: US 11,483,522 B2
(45) Date of Patent: Oct. 25, 2022

(54) DOOR CONTROL SYSTEMS AND METHODS

(71) Applicant: Ford Global Technologies, LLC, Dearborn, MI (US)

(72) Inventor: Grant Inskeep, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 698 days.

(21) Appl. No.: 16/469,198

(22) PCT Filed: Dec. 14, 2016

(86) PCT No.: PCT/US2016/066710
§ 371 (c)(1),
(2) Date: Jun. 13, 2019

(87) PCT Pub. No.: WO2018/111266
PCT Pub. Date: Jun. 21, 2018

(65) Prior Publication Data
US 2020/0024884 A1  Jan. 23, 2020

(51) Int. Cl.
| | |
|---|---|
| B60R 25/00 | (2013.01) |
| H04N 7/18 | (2006.01) |
| E05F 15/40 | (2015.01) |
| E05F 15/73 | (2015.01) |
| G06T 7/70 | (2017.01) |

(52) U.S. Cl.
CPC ............ *H04N 7/183* (2013.01); *E05F 15/40* (2015.01); *E05F 15/73* (2015.01); *G06T 7/70* (2017.01); *H04N 7/18* (2013.01); *E05F 2015/767* (2015.01); *G06T 2207/30248* (2013.01)

(58) Field of Classification Search
CPC . H04N 7/183; H04N 7/18; E05F 15/40; E05F 15/73; E05F 2015/767; G06T 7/70; G06T 2207/30248
USPC ........................................................ 340/5.71
See application file for complete search history.

(56) References Cited

U.S. PATENT DOCUMENTS

| | | | | |
|---|---|---|---|---|
| 7,023,322 | B2 * | 4/2006 | Baumgardner .... | G07C 9/00182 340/5.71 |
| 7,082,391 | B1 * | 7/2006 | Merrill ..................... | E05F 15/40 704/231 |
| 10,936,050 | B2 * | 3/2021 | Yamamoto ......... | G01C 21/3679 |
| 2009/0030579 | A1 | 1/2009 | Takehisa | |
| 2009/0289892 | A1 * | 11/2009 | Cox ........................ | G06F 3/017 707/999.201 |
| 2010/0149090 | A1 * | 6/2010 | Morris .................... | G06F 3/017 345/156 |
| 2010/0274480 | A1 * | 10/2010 | McCall .............. | G01C 21/3664 715/863 |

(Continued)

FOREIGN PATENT DOCUMENTS

WO  2015/052476 A1  4/2015

*Primary Examiner* — Zhen Y Wu
(74) *Attorney, Agent, or Firm* — Brandon Hicks; Eversheds Sutherland (US) LLP

(57) ABSTRACT

Example door control systems and methods are described. In one implementation, a method receives image data from a camera mounted to a vehicle. The image data is analyzed by a door control system to determine whether a user is near the vehicle. If a user is identified near the vehicle, the method determines whether the user intends to open a garage door based on the image data.

17 Claims, 5 Drawing Sheets

(56) References Cited

U.S. PATENT DOCUMENTS

| | | | | |
|---|---|---|---|---|
| 2011/0301955 A1* | 12/2011 | Byrne | ................ | G06F 3/167 |
| | | | | 704/E15.005 |
| 2013/0069867 A1* | 3/2013 | Watanabe | ............. | G06F 3/0482 |
| | | | | 345/156 |
| 2014/0181105 A1* | 6/2014 | Avila | ................ | G06F 16/29 |
| | | | | 707/736 |
| 2015/0362988 A1* | 12/2015 | Yamamoto | ......... | G01C 21/3682 |
| | | | | 345/156 |
| 2018/0315415 A1* | 11/2018 | Mosley | ................ | G10L 15/063 |

\* cited by examiner

DOOR CONTROL SYSTEMS AND METHODS

TECHNICAL FIELD

The present disclosure relates to systems and methods that control the operation of a door, such as a garage door.

BACKGROUND

Automobiles and other vehicles provide a significant portion of transportation for commercial, government, and private entities. Vehicles are often parked in garages or other structures that have doors (e.g., garage doors) that open and close to allow vehicles and users to enter and exit the garage. In some situations, when a user enters a garage with a parked car, the user intends to exit the garage (e.g., exiting while driving the vehicle or simply walking out of the garage). Taking the time necessary to open a garage door is an inconvenience to many users. Additionally, forgetting to open a garage door before driving a vehicle out of the garage causes damage to the garage door and the vehicle. Automatically opening a garage door for a user provides a convenience to the user and prevents the user from accidentally driving into the garage door.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
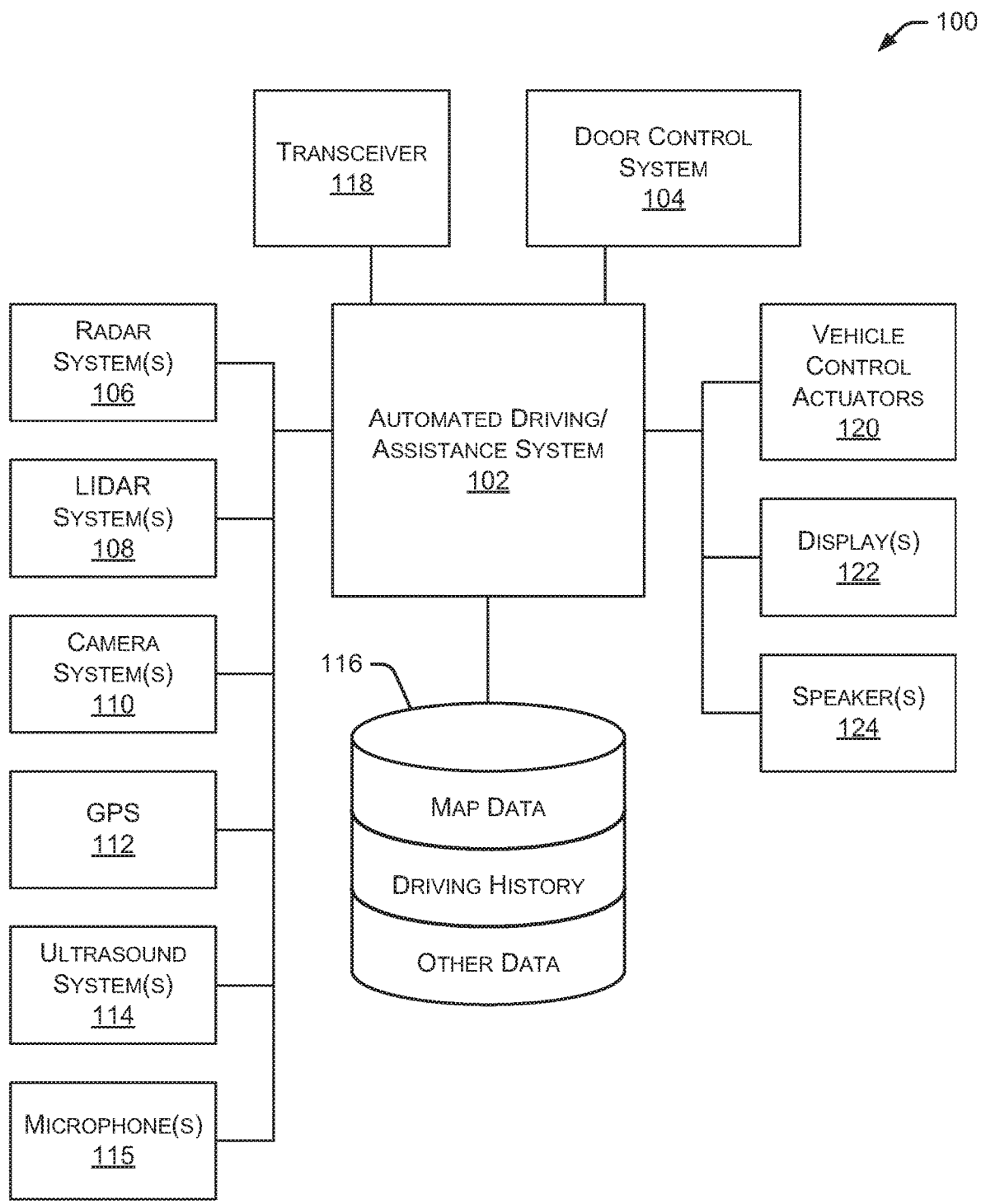
FIG. 1 is a block diagram illustrating an embodiment of a vehicle control system that includes a door control system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

FIG. 1 is a block diagram illustrating an embodiment of a vehicle control system 100 that includes a door control system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes door control system 104 that interacts with various components in the vehicle control system to detect a user near a vehicle and control the operation of a garage door or other door mechanism. In one embodiment, door control system 104 detects a user near a vehicle and determines that the user intends to open the garage door. Although door control system 104 is shown as a separate component in FIG. 1, in alternate embodiments, door control system 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, one or more ultrasound systems 114, and/or one or more microphones 115. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. Microphones 115 may include external microphones mounted anywhere on the vehicle to detect sounds near the vehicle. Microphones 115 may also include interior microphones mounted inside the vehicle to detect sounds generated within the vehicle. Vehicle control system 100 may include a data store 116 for storing relevant or useful data for navigation and safety, such as map data, driving history, or other data. Additionally, data store 116 may store information related to sinkholes previously detected by the current vehicle or reported by other vehicles. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle around an approaching sinkhole in the roadway. The sensor systems/devices 106-110, 114, and 115 may be used to obtain real-time sensor data so that the automated driving/assistance system 102 can assist a driver or drive a vehicle in real-time.

Figure 2:
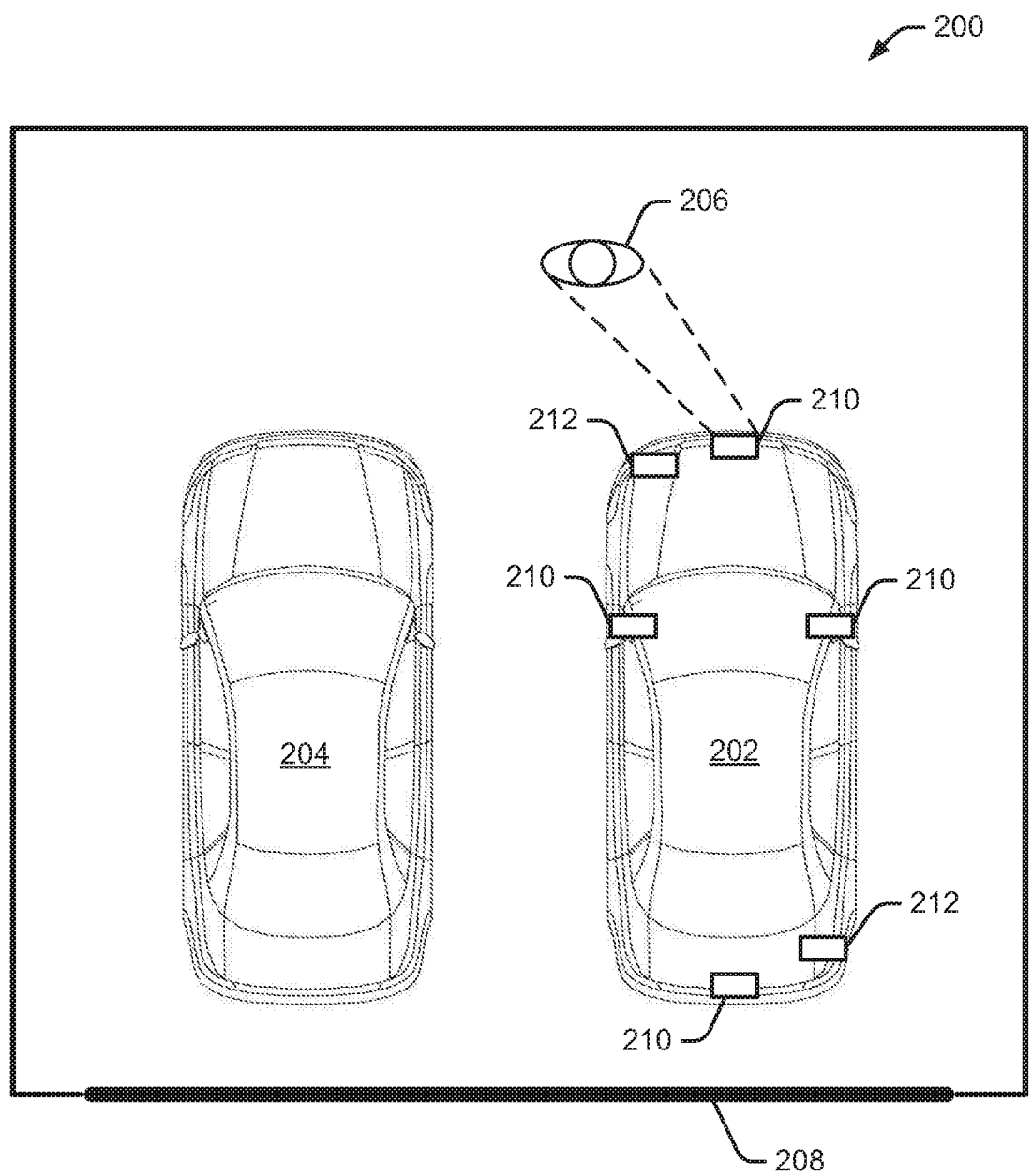
FIG. 2 illustrates an embodiment of two vehicles parked in a garage or other parking structure.

FIG. 2 illustrates an embodiment 200 of two vehicles parked in a garage or other parking structure. In the embodiment of FIG. 2, two vehicles 202 and 204 are shown parked next to each other in the garage. In alternate embodiments, a particular garage may have any number of parking spaces and may include any number of parked cars. Vehicles 202 and 204 may include some or all of the components shown in vehicle control system 100. The garage includes a garage door 208 that allows vehicles 202 and 204 to enter and exit the garage. In some embodiments, garage door 208 is an overhead door that opens and closes using a motorized opening/closing system. In other embodiments, garage door 208 may be any type of door or other mechanism that opens and closes to allow or restrict access to the garage.

In the example of FIG. 2, a user 206 is in the garage near vehicle 202. One or more sensors on vehicle 202 detect the presence of user 206. For example, one or more of radar system 106, LIDAR system 108, camera 110, ultrasound system 114 or microphone 115 may detect the presence of user 206 near vehicle 202. When user 206 is detected, door control system 104 (FIG. 1) may be activated to capture images of the user, which are used to determine whether user 206 intends to open the garage door. Additionally, upon detection of user 206, door control system 104 may capture audio data and identify words spoken by user 206, which are also used to determine whether user 206 intends to open the garage door. In some embodiments, vehicle 202 includes multiple camera systems 210 positioned at different locations of vehicle 202. The different positions of camera systems 210 provide different viewing angles of various areas surrounding vehicle 202. Vehicle 202 also includes multiple microphones 212 positioned at different locations of vehicle 202. The different positions of microphones 212 capture different sounds from various areas surrounding vehicle 202. Although four camera systems 210 and two microphones 212 are shown in FIG. 2, alternate vehicles may include any number of camera systems 210 and any number of microphones 212, each positioned at any location of the vehicle.

Figure 3:
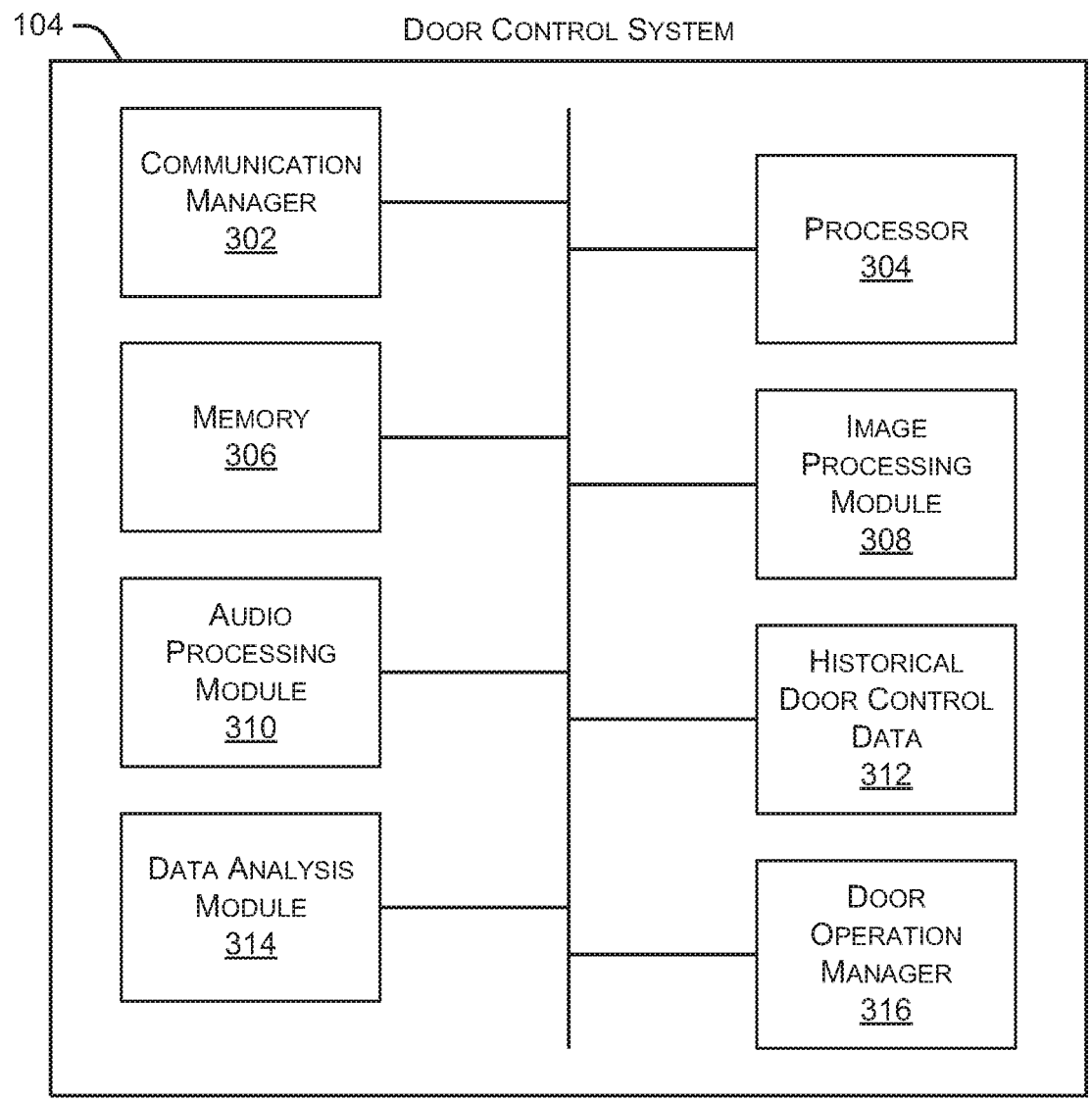
FIG. 3 is a block diagram illustrating an embodiment of a door control system.

FIG. 3 is a block diagram illustrating an embodiment of door control system 104. As shown in FIG. 3, door control system 104 includes a communication manager 302, a processor 304, and a memory 306. Communication manager 302 allows door control system 104 to communicate with other systems, such as automated driving/assistance system 102. Additionally, communication manager 302 allows door control system 104 to communicate with a garage door opening/closing mechanism that controls the opening and closing of the garage door. In some embodiments, communication manager 302 communicates wirelessly with one or more systems or components, such as communicating wirelessly with a garage door opening/closing mechanism to instruct the mechanism to open or close the garage door.

Processor 304 executes various instructions to implement the functionality provided by door control system 104 as discussed herein. Memory 306 stores these instructions as well as other data used by processor 304 and other modules and components contained in door control system 104. Additionally, door control system 104 includes an image processing module 308 that receives image data from one or more camera systems 110 and identifies, for example, a user near the vehicle as well as characteristics of the user, such as user appearance, number of users, and the like. Door control system 104 also includes an audio processing module 310 that receives audio data from one or more microphones 115 and identifies, for example, words spoken by one or more users near the vehicle.

Door control system 104 further includes historical door control data 312, which identifies user characteristics and other data associated with historical situations when a user intended to open a garage door. Historical door control data 312 may include data such as a vehicle's parked location, day of the week, time of day, appearance of the user when near the vehicle, and the like. In particular embodiments, user appearance information may include the user's hair appearance, clothing (or attire) worn (e.g., jacket, dress clothes, work clothes, pajamas, exercise clothes, dress shoes, athletic shoes or slippers), items carried by the user (e.g., a purse, briefcase, suitcase, backpack or athletic bag), words spoken by the user, and the like.

Any of the historical information may be compared to a user's current appearance to predict a user's intent to open the garage door. For example, a data analysis module 314 may analyze current data (e.g., image data and audio data) and compare it to historical data to determine whether a user likely intends to open the garage door. If data analysis module 314 determines with a sufficient degree of certainty that the user intends to open the garage door, a door operation manager 316 may issue a command (via communication manager 302) instructing a garage door opening/closing mechanism to open the garage door. This automated process is convenient to the user because they don't need to manually activate the garage door opening/closing mechanism, and the automated process avoids accidentally driving a vehicle into a closed garage door.

Figure 4:
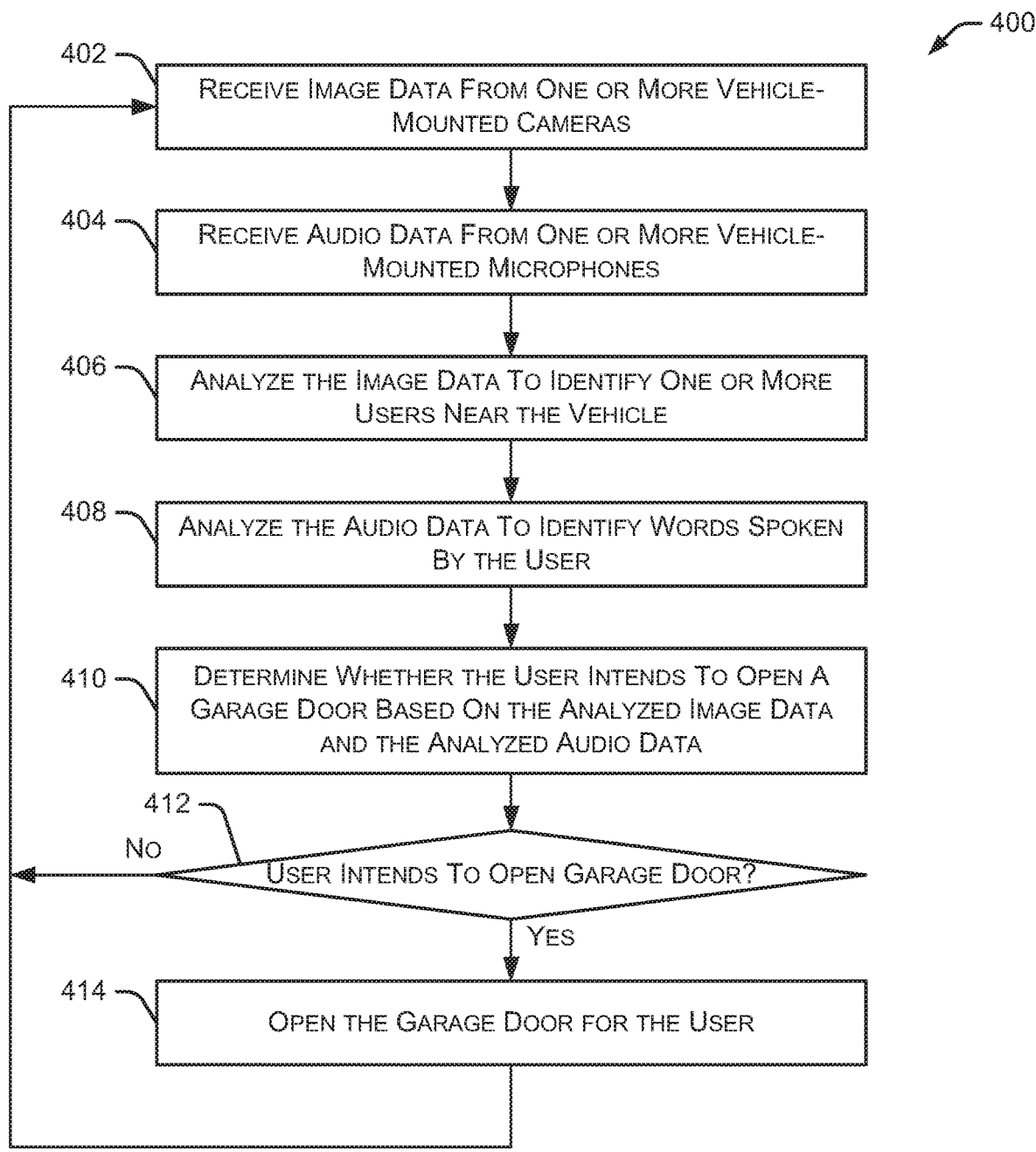
FIG. 4 illustrates an embodiment of a method for automatically opening a garage door for a user.

FIG. 4 illustrates an embodiment of a method 400 for automatically opening a garage door for a user. Initially, method 400 receives 402 image data from one or more vehicle-mounted cameras. Additionally, method 400 may receive data from one or more other vehicle sensors, such as the sensors discussed herein with respect to FIG. 1. Method 400 also receives 404 audio data from one or more vehicle-mounted microphones. After receiving the image data, method 400 analyzes 406 the image data to identify one or more users near the vehicle. As discussed herein, method 400 may also analyze data from other vehicle sensors to detect one or more users near the vehicle. Method 400 also analyzes 408 the received audio data to identify words spoken by the user. In some embodiments, the audio data is also analyzed to detect one or more users near the vehicle.

Method 400 continues by determining 410 whether the user intends to open a garage door based on the analyzed image data and the analyzed audio data. In alternate embodiments, the method can make the determination 410 based on either the analyzed image data or the analyzed audio data (i.e., only one type of data is needed to make the determination). In some embodiments, the determination 410 is based on a user's appearance, such as the user's hair appearance, clothing worn (e.g., jacket, dress clothes, work clothes, pajamas, exercise clothes, dress shoes, athletic shoes or slippers), items carried by the user (e.g., a purse, briefcase, suitcase, backpack or athletic bag), words spoken by the user, and the like. As discussed herein, any of this information may be compared to a user's current appearance to predict a user's intent to open the garage door. At 412, method 400 determines whether the user intends to open the garage door. If the user does not intend to open the garage door, method 400 returns to 402 and continues to monitor the user's activities and movement. If the user intends to open the garage door, method 400 automatically opens 414 the garage door for the user.

As discussed herein, the user's appearance is relevant to determining whether they intend to open the garage door. For example, a user near the vehicle who has messy hair and is wearing pajamas and slippers is not likely to be driving their vehicle, so the systems and methods described herein do not automatically open the garage door. However, a user with neat hair, work clothing, and carrying a briefcase is likely to be driving their vehicle. In this situation, the systems and methods described herein automatically open the garage door.

In some embodiments, method 400 also determines whether the user unlocks the vehicle or opens the driver's door of the vehicle. If the user unlocks the vehicle or opens the driver's door of the vehicle, method 400 determines that the user intends to open the garage door and automatically opens the garage door for the user.

In some embodiments, method 400 accesses a user's schedule for a particular day and identifies any meetings or other activities on the schedule that the user needs to leave for. For example, if the user has a doctor's appointment at an office that is 15 minutes from the user's home, detecting the user approaching the vehicle 15 minutes before that appointment would indicate the user's likely intent to open the garage door.

Figure 5:
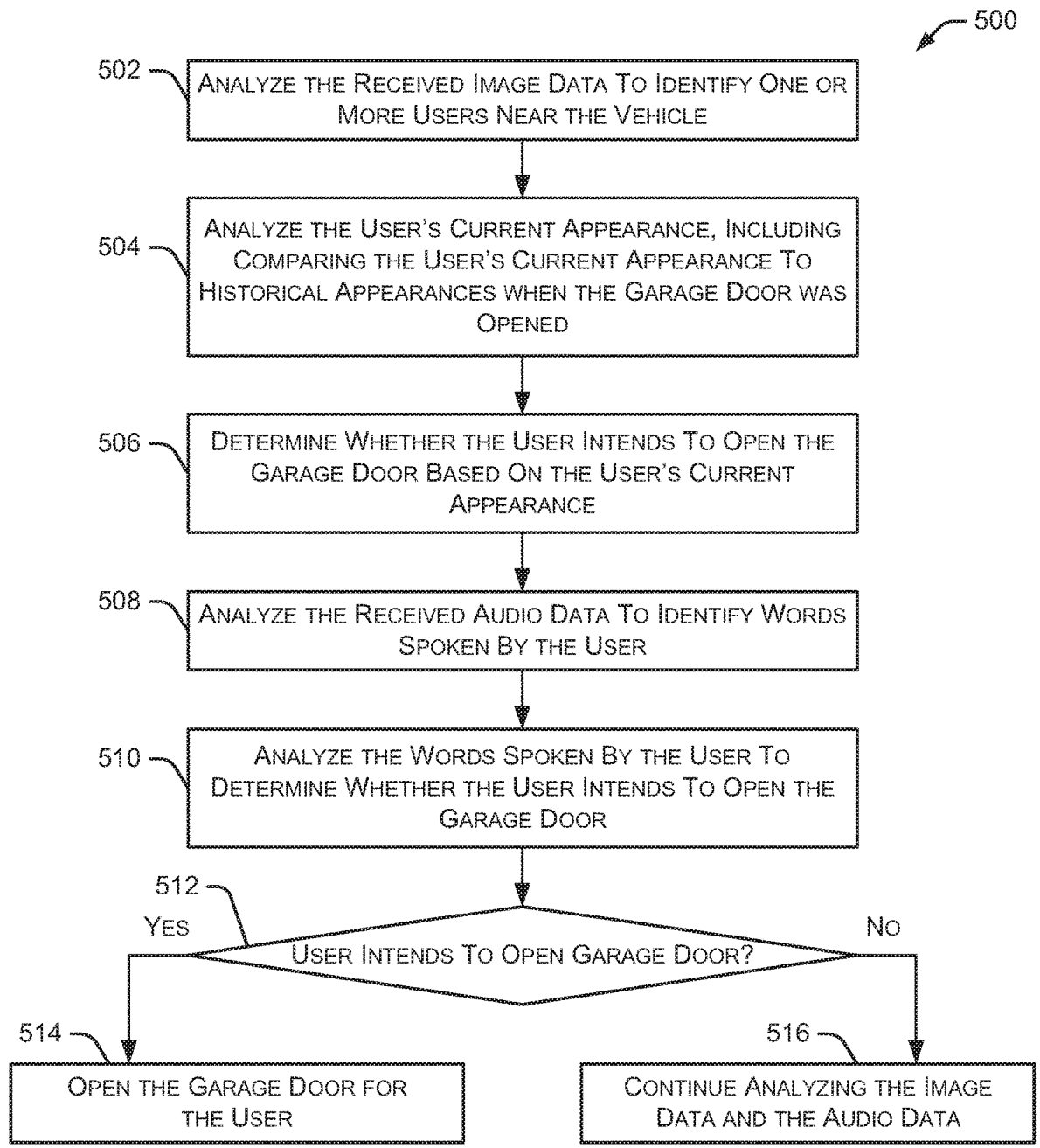
FIG. 5 illustrates an embodiment of a method for determining whether a user intends to open a garage door.

FIG. 5 illustrates an embodiment of a method 500 for determining whether a user intends to open a garage door. Initially, method 500 analyzes 502 received imaged data to identify one or more users near the vehicle. As discussed herein, other sensor data may be used instead of image data to identify a user near the vehicle. Method 500 analyzes 504 the user's current appearance, including comparing the user's current appearance to historical appearances when the garage door was opened. The method next determines 506 whether the user intends to open the garage door based on the user's current appearance. The audio data is also analyzed 508 to identify words spoken by the user. The spoken words are analyzed 510 to determine whether the words indicate that the user intends to open the garage door. For example, if the user says, "OK, I'm leaving now" or "I'm going to work now", those statements indicate a high likelihood that the user intends to open the garage door.

At 512, method 500 determines whether the user intends to open the garage door. If the user intends to open the garage door, method 500 opens 514 the garage door for the user. If the user does not intend to open the garage door, method 500 continues analyzing 516 the image data and audio data, but does not open the garage door.

In some embodiments, method 500 may consider additional parameters when determining whether the user intends to open the garage door. For example, method 500 may consider the geographical location of the vehicle, the time of day, day of the week, and the like to determine whether the user intends to open the garage door. In some embodiments, these parameters, including historical data associated with the parameters, is stored for future reference in determining a user's intent to open the garage door. In one example, if the vehicle is located in the user's garage and the user approaches the vehicle at the time they normally drive to work or school (based on stored historical data), method 500 presumes that the user is going to work or school and opens the garage door. Other patterns based on geographic location, date, and/or time can also be determined based on the historical data. This historical data may be associated with a particular user to learn that user's habits and schedule.

In some embodiments, method 500 may detect multiple users approaching the vehicle at the same time. In this situation, method 500 may determine a higher likelihood that the users want to open the garage door because a group of people are moving toward the vehicle. Additionally, method 500 may identify the multiple users and search the historical data to see if this group of multiple users have previously approached the car. If so, method 500 may determine whether to open the garage door based on whether the group previously opened the garage door when they approached the vehicle.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
receiving image data from a camera mounted to a vehicle;
analyzing, by a door control system, the image data to determine whether a user is proximate the vehicle; and
responsive to determining that a user is proximate the vehicle, determining whether the user intends to open a garage door based on the image data, wherein determining whether the user intends to open a garage door includes:
analyzing the user's current appearance based on the image data; and
determine whether the user intends to open the garage door based on the user's current appearance,
wherein analyzing the user's current appearance includes at least one of analyzing attire worn by the user and determining whether the attire worn by the user indicates that the user intends to leave the garage.

2. The method of claim 1, wherein the door control system is contained within the vehicle.

3. The method of claim 1, further comprising opening the garage door responsive to determining that the user intends to open the garage door.

4. The method of claim 1, wherein analyzing the user's current appearance includes at least one of analyzing attire worn by the user, determining whether the user is carrying a briefcase, determining whether the user is carrying a backpack, and determining whether the user is carrying a suitcase.

5. The method of claim 1, wherein analyzing the user's current appearance includes at least one of analyzing attire worn by the user and determining whether the attire worn by the user indicates that the user intends to drive the vehicle out of the garage.

6. The method of claim 1, further comprising:
determining that the user unlocked at least one vehicle door; and
responsive to determining that the user unlocked at least one vehicle door, opening the garage door.

7. The method of claim 1, further comprising:
receiving historical data indicating the user's previous appearance when opening the garage door; and
wherein determining whether the user intends to open a garage door includes comparing the user's current appearance with the user's previous appearance when opening the garage door.

8. The method of claim 1, further comprising:
determining the current day and time;
receiving historical data indicating previous days and times that the user opened the garage door; and
wherein determining whether the user intends to open a garage door includes comparing the previous days and times that the user opened the garage door with the current day and time.

9. The method of claim 1, further comprising:
receiving audio data from a microphone mounted to the vehicle;
analyzing, by the door control system, the audio data to determine words spoken by the user; and wherein determining whether a user intends to open a garage door is further based on the words spoken by the user.

10. The method of claim 9, further comprising:
receiving historical data indicating the words previously spoken by the user when opening the garage door; and
wherein determining whether the user intends to open a garage door further includes comparing the current words spoken by the user with words previously spoken by the user when opening the garage door.

11. A method comprising:
detecting a user proximate a vehicle;
receiving images of the user from a camera mounted to the vehicle;
analyzing, by a door control system, the images of the user to determine the user's current appearance;
receiving, by the door control system, historical data indicating the user's previous appearances when opening a garage door; and
determining, by the door control system, whether the user intends to open the garage door by comparing the user's current appearance with the user's previous appearances when opening the garage door,
wherein analyzing the images of the user to determine the user's current appearance includes at least one of analyzing attire worn by the user, determining whether the user is carrying a briefcase, determining whether the user is carrying a backpack, and determining whether the user is carrying a suitcase.

12. The method of claim 11, wherein detecting a user proximate a vehicle includes analyzing data from at least one sensor mounted to the vehicle.

13. The method of claim 11, wherein the door control system is contained within the vehicle.

14. The method of claim 11, further comprising:
determining a current time of day;
accessing historical data associated with similar times of day; and
wherein determining whether the user intends to open the garage door further includes comparing the user's current appearance with the user's previous appearances at similar times of day.

15. The method of claim 11, further comprising:
receiving audio data from a microphone mounted to the vehicle;
analyzing, by the door control system, the audio data to determine words spoken by the user; and
wherein determining whether the user intends to open the garage door is further based on the words spoken by the user.

16. A method comprising:
receiving image data from a camera mounted to a vehicle;
analyzing, by a door control system, the image data to determine whether a user is proximate the vehicle; and
responsive to determining that a user is proximate the vehicle, determining whether the user intends to open a garage door based on the image data, wherein determining whether the user intends to open a garage door includes:
analyzing the user's current appearance based on the image data; and
determine whether the user intends to open the garage door based on the user's current appearance,
wherein analyzing the user's current appearance includes at least one of analyzing attire worn by the user and determining whether the attire worn by the user indicates that the user intends to drive the vehicle out of the garage.

17. A method comprising:
receiving image data from a camera mounted to a vehicle;
analyzing, by a door control system, the image data to determine whether a user is proximate the vehicle;
responsive to determining that a user is proximate the vehicle, determining whether the user intends to open a garage door based on the image data;
determining that the user unlocked at least one vehicle door; and
responsive to determining that the user unlocked at least one vehicle door, opening the garage door.

* * * * *